(12) United States Patent
Majolo et al.

(10) Patent No.: US 6,790,903 B1
(45) Date of Patent: Sep. 14, 2004

(54) DISPERSIONS OF SILYL-TERMINATED POLYMERS WITH A HIGH SOLIDS CONTENT, THEIR PRODUCTION AND THEIR USE

(75) Inventors: Martin Majolo, Erkelenz (DE); Wolfgang Klauck, Meerbusch (DE); Johann Klein, Duesseldorf (DE); Wolfgang Ernst, Duesseldorf (DE); Gaby Schilling, Duesseldorf (DE); Helmut Loth, Essen (DE)

(73) Assignee: Henkel Kommanditgesellschaft auf Aktien (Henkel KGaA), Duesseldorf (DE)

( * ) Notice: Subject to any disclaimer, the term of this patent is extended or adjusted under 35 U.S.C. 154(b) by 0 days.

(21) Appl. No.: 09/857,933

(22) PCT Filed: Dec. 3, 1999

(86) PCT No.: PCT/EP99/09442

§ 371 (c)(1),
(2), (4) Date: Jun. 11, 2001

(87) PCT Pub. No.: WO00/35981

PCT Pub. Date: Jun. 22, 2000

(30) Foreign Application Priority Data

Dec. 11, 1998 (DE) .......................................... 198 58 908

(51) Int. Cl.$^7$ ......................... C08L 75/04; C08L 83/14; B05D 5/10
(52) U.S. Cl. ..................... 524/506; 524/588; 524/591; 524/837; 524/858; 427/207.1; 428/448
(58) Field of Search ................................ 524/506, 588, 524/591, 858, 837; 528/29; 427/207.1; 428/448

(56) References Cited

U.S. PATENT DOCUMENTS

| | | |
|---|---|---|
| 3,941,733 A | 3/1976 | Chang ........................ 260/29.2 |
| 4,567,228 A * | 1/1986 | Gaa et al. |
| 4,816,506 A | 3/1989 | Gamon et al. ................. 524/96 |
| 5,041,494 A | 8/1991 | Franke et al. ................ 524/588 |
| 5,162,420 A * | 11/1992 | Chang et al. |
| 5,288,359 A * | 2/1994 | Stobbie, IV et al. |
| 5,554,709 A | 9/1996 | Emmerling et al. .......... 528/27 |
| 5,681,622 A | 10/1997 | Vogt-Birnbrich et al. 427/407.1 |
| 5,760,123 A | 6/1998 | Vogt-Birnbrich et al. ... 524/500 |
| 6,313,335 B1 * | 11/2001 | Roberts et al. ............. 556/419 |
| 6,355,127 B1 * | 3/2002 | Mahdi et al. |

FOREIGN PATENT DOCUMENTS

| | | |
|---|---|---|
| AU | 705622 | 6/1996 |
| DE | 857 364 | 11/1952 |
| DE | 1 768 313 | 4/1971 |
| DE | 25 58 653 | 7/1976 |
| DE | 36 37 836 | 5/1988 |
| DE | 42 09 325 | 9/1993 |
| DE | 42 15 648 | 12/1994 |
| DE | 44 13 562 | 10/1995 |
| DE | 195 07 416 | 9/1996 |
| EP | 0 163 214 | 12/1985 |
| EP | 0 315 006 | 5/1989 |
| EP | 0 184 829 | 3/1991 |
| EP | 0 498 422 | 8/1992 |
| EP | 0 549 626 | 11/1994 |
| EP | 0 818 496 | 1/1998 |
| WO | WO91/08244 | 6/1991 |

OTHER PUBLICATIONS

Kirk–Othmer, Surfactants and Detersive Systems, *Encyclopedia of Chemical Technology*, 3$^{RD}$ Edition, vol. 22, pp. 373–376, John Wiley and Sons, New York (1983).

Kirk–Othmer, Surfactants and Detersive Systems, *Encyclopedia of Chemical Technology*, 3$^{rd}$ Edition, vol. 22, pp. 367–368, John Wiley and Sons, New York (1983).

Edwin P. Plueddemann, Aqueous Solutions of Silant Coupling Agents, *Silane Coupling Agents*, 2$^{nd}$ Edition, vol. 2, pp. 55–78, Plenum Press, New York, (1991).

* cited by examiner

Primary Examiner—Tae H. Yoon
(74) Attorney, Agent, or Firm—Woodcock Washburn LLP

(57) ABSTRACT

The invention relates to a polymer dispersion containing water and at least 60 wt. % of an organic polymer which has at least one group of general formula (I) A—Si(Z)$_n$(OH)$_{3-n}$. The invention also relates to a composition containing at least one organic polymer which has at least one group of general formula (I), and at least one other organic polymer or a mixture of two or more other organic polymers.

20 Claims, No Drawings

DISPERSIONS OF SILYL-TERMINATED POLYMERS WITH A HIGH SOLIDS CONTENT, THEIR PRODUCTION AND THEIR USE

This application claims priority from German application 19858908.5, filed Dec. 11, 1998, and International application PCT/EP99/09442, filed Dec. 3, 1999.

The invention relates to a polymer dispersion comprising water and at least 60% by weight of an organic polymer containing at least one group of the general formula (I)

$$—A—Si\ (Z)_n(OH)_{3-n} \qquad (I)$$

in which A is $CH_2$ or a linear or branched, saturated or unsaturated alkylene radical having from 2 to about 12 C atoms or is an arylene radical having from about 6 to about 18 C atoms or an arylenealkylene radical having from about 7 to about 19 C atoms, Z is $CH_3$, O—$CH_3$ or a a linear or branched, saturated or unsaturated alkyl radical or alkoxy radical having from 2 to about 12 C atoms and n is 0, 1 or 2, or a condensation product of at least two such groups.

The invention likewise relates to a composition comprising an organic polymer containing at least one group of the general formula I and at least one further organic polymer or a mixture of two or more further organic polymers.

Silane-terminated, moisture-curing one-component polyurethane compositions are increasingly being used as flexible coating, sealing and adhesive compositions in construction and in the automobile industry. In such applications, stringent requirements are imposed on the extensibility, adhesion and curing rate. Moreover, such silane-terminated polymers often have water repellency properties, which give the sealing, coating or adhesive compositions prepared from them excellent water resistance and heat resistance.

The prior art discloses alkoxysilane-terminated polymers which are used as flexible sealing, coating and adhesive compositions.

For instance, EP-B 0 549 626 describes alkoxysilane-terminated, moisture-curing, one-component polyurethanes which find application, for example, as joint-sealing compositions. The compounds disclosed rapidly form a skin and rapidly attain freedom from tack, even after prolonged storage. A disadvantage of the compounds described, however, is that owing to their reactive end groups they have to be stored under moisture exclusion conditions and over a prolonged period of storage there is the risk of irreversible changes in properties.

In order to remedy this disadvantage, attempts have been made in the past to prepare dispersions of silane-terminated polymers. For example, DE-A 36 37 836 describes an aqueous silicone dispersion obtainable from an OH-terminated polydiorganosiloxane, (organo) metallic compounds and a siliconate. The products described have a curing time of at least one day. Polymers containing at least one group of the general formula —A—Si$(Z)_n$(OH)$_{3-n}$ are not disclosed in the document.

DE-C 42 15 648 relates to a dispersion of alkoxysilane-terminated polymers whose chain contains amino groups capable of forming salts. Dispersions having a solids content of not more than 41% by weight are described. When such dispersions are used to bond absorbent materials, the high water content imposes a high water load on the substrate. In the case of paper bonds, for example, this may lead to dimensional changes in the substrate, which are unwanted.

WO 91/08244 relates to masonry preservatives which comprise polyurethanes terminated by alkoxysilane groups. The polymer contents of the dispersions described, however, are very low, at between 5 and 30% by weight. Moreover, the dispersions have a pH of $\geq 10$. Therefore, the dispersions described are useful neither as surface coating compositions for producing coatings with mechanical load-bearing properties, nor as sealants or adhesives.

DE-US 25 58 653 relates to silanol-containing urethane dispersions. The polyurethanes described contain hydrolyzable or hydrolyzed silyl end groups and in the polymer backbone possess solubilizing or emulsifying groups, especially carboxyl groups. The dispersions described have polymer contents of up to about 40% by weight. The polymers described are required to contain, as well as the solubilizing groups, urea groups, which are produced by chain extension of a prepolymer with isocyanate end groups in water. At high siloxane contents, the compounds described exhibit a high level of formation of coagulum, and their water resistance is unsatisfactory.

A problematic consequence with all of the prior art dispersions of silanol-terminated polyurethanes is that the achievable solids contents are low. Such low solids contents are, however, beset by a number of drawbacks, whose elimination was an object of the present invention. This object is achieved by means of a polymer dispersion comprising water and at least 60% by weight of an organic polymer containing at least one group of the general formula —A—Si$(Z)_n$(OH)$_{3-n}$ (formula I).

The invention accordingly provides a polymer dispersion comprising water and at least 60% by weight of an organic polymer containing at least one group of the general formula I $$—A—Si\ (Z)_n(OH)_{3-n} \qquad (I)$$

in which A is $CH_2$ or is a linear or branched, saturated or unsaturated alkylene radical having from 2 to about 12 C atoms or is an arylene radical having from about 6 to about 18 C atoms or an arylenealkylene radical having from about 7 to about 19 C atoms or an alkyl-, cycloalkyl- or aryl-substituted siloxane radical having from about 1 to about 20 Si atoms, Z is $CH_3$, O—$CH_3$ or is a linear or branched, saturated or unsaturated alkyl radical or alkoxy radical having from 2 to about 12 C atoms, and n is 0, 1 or 2, or a condensation product of at least two such groups.

Suitable organic polymers containing at least one group of the general formula I are all organic polymers that are dispersible in water by by means of suitable methods. In one preferred embodiment of the invention, the composition of the invention comprises as organic polymer a polymer selected from the group consisting of polyurethanes, polyesters, polyamides, polyethers, polyacrylates, polymethacrylates, polystyrene, polybutadiene, polyethylene, polyvinyl esters, ethylene/α-olefin copolymers, styrene/butadiene copolymers, styrene/acrylonitrile copolymers, ethylene/vinyl acetate copolymers, or a mixture of two or more of said polymers.

Said polymers may, where possible, be provided with solubilizing groups, i.e, groups capable of dissociation in water. In one preferred form of the invention, however, the organic polymers either have no water-dissociable groups or, where such groups are present, the conditions in the polymer dispersion of the invention are chosen such that the water-dissociable groups are present in dissociated form only to a minor extent if at all.

For the purposes of the present text, a "water-dissociable group" means a functional group which, in an acidic, neutral or basic aqueous solution, undergoes dissociation into an anion and a cation.

In one preferred embodiment of the invention, a polyurethane is used as organic polymer. Suitable polyurethanes are preparable, for example, using the following building blocks:

a) at least one polyisocyanate,
b) at least one polyol,
c) at least one alkoxysilane of the general formula II

 (II)

in which X is a radical containing at least one isocyanate-reactive functional group, for example at least one OH, SH, NH or COOH group, or at least one OH-reactive group, for example, at least one carboxyl; anhydride, NCO or oxirane group, or a mixture of two or more such groups, A is $CH_2$ or is a linear or branched, saturated or unsaturated alkylene radical having from 2 to about 12 C atoms or is an arylene radical having from about 6 to about 18 C atoms or an arylenealkylene radical having from about 7 to about 19 C atoms or an alkyl-, cycloalkyl- or aryl-substituted siloxane radical having from about 1 to about 20 Si atoms, Z is $CH_3$, $O—CH_3$ or is a linear or branched, saturated or unsaturated alkyl radical or alkoxy radical having from 2 to about 12 C atoms, R is $CH_3$ or a linear or branched, saturated or unsaturated alkyl radical having from 2 to about 12 C atoms, and n is 0, 1 or 2.

If desired, it is possible in addition to use up to about 20% by weight of chain extender (building block d), based on the polyurethane weight.

Suitable isocyanates (building block a) are any desired organic compounds which contain on average more than one, especially 2 isocyanate groups.

Preference is given to using diisocyanates $Q(NCO)_2$, where Q is an aliphatic, optionally substituted hydrocarbon radical having from 4 to about 12 carbon atoms, an optionally substituted cycloaliphatic hydrocarbon radical having from 6 to about 15 carbon atoms, an optionally substituted aromatic hydrocarbon radical having from 6 to about 15 carbon atoms or an optionally substituted araliphatic hydrocarbon radical having from 7 to about 15 carbon atoms. Examples of such diisocyanates are tetramethylene diisocyanate, hexamethylene diisocyanate (HDI), dodecamethylene diisocyanate, dimer fatty acid diisocyanate, 1,4-diisocyanatocyclohexane, 1-isocyanato-3,3,5-trimethyl-5-isocyanatomethylcyclohexane (isophorone diisocyanate, IPDI), 4,4'-diisocyanato-dicyclohexylmethyl, 2,2-bis(4,4'-diisocyanato-dicyclohexyl)propane, 1,3- and 1,4-diisocyanatobenzene, 2,4- or 2,6-diisocyanatotoluene (2,4- or 2,6-TDI) or a mixture thereof, 2,2'-, 2,4 or 4,4'-diisocyanato-diphenylmethane (MDI), tetramethylxylylene diisocyanate (TMXDI), p-xylylene diusocyanate, and mixtures of these compounds.

Preference is given to aliphatic diisocyanates, especially m- and p-tetramethylxylylene diisocyanate (TMXI) and isophorone diisocyanate (IPDI).

It is of course also possible to use as well, proportionately, the polyisocyanates of higher functionality that are known per se in polyurethane chemistry, or else conventional modified polyisocyanates, containing for example carbodiimide groups, allophanate groups, isocyanurate groups, urethane groups or biuret groups.

Suitable building blocks (b) include OH-terminated polyols or polyol mixtures, as known to the skilled worker in polyurethane preparation and as may commonly be used in preparing polyurethanes. In the context of the present invention it is possible to use polyols from the group of the polyetherpolyols, polyesterpolyols, polyetheresterpolyols, polyalkylenediols, polycarbonates or polyacetals, or a mixture of two or more thereof, having in each case 2, 3, 4 or more OH groups.

Said polyols and their preparation are known from the prior art. For example, polyesterpolyols may be prepared by reacting dicarboxylic acids with diols or higher polyols or a mixture of diols and higher polyols or an excess of diols or higher polyols or the mixture thereof, and also by ring-opening epoxidized esters, examples being epoxidized fatty acid esters, with alcohols. Polycaprolactonediols as well, preparable for example from ε-caprolactone and diols or higher polyols, are suitable as polyesterpolyols. In the context of the present invention it is possible, for example, to use polyesterpolyols obtainable from low molecular mass dicarboxylic acids such as succinic acid, glutaric acid, adipic acid, isophthalic acid, terephthalic acid or phthalic acid, or a mixture of two or more thereof, with an excess of linear or branched, saturated or unsaturated aliphatic diols having from about 2 to about 12 carbon atoms. In the preparation of the polyesterpolyols it is also possible if desired for there to be a small fraction of alcohols of higher functionality, of which examples include glycerol, trimethylolpropane, triethylolpropane, pentaerythritol or sugar alcohols, such as sorbitol, mannitol or glucose.

Polyacetals that may be mentioned include, for example, the polycondensation products of formaldehyde and diols or polyols or mixtures thereof in the presence of acidic catalysts.

Polyalkylenediols such as polybutadienediol are commercially available products which are offered in a variety of molecular weights. In the context of the present invention they are suitable, for example, as a polyol component in the preparation of polyurethanes as may be used in the dispersions of the invention.

Polyetherpolyols may be obtained, for example, by homopolymerization, copolymerization or block polymerization of alkylene oxides such as ethylene oxide, propylene oxide or butylene oxide, or mixtures of two or more thereof, or by reaction of polyalkylene glycols with difunctional or trifunctional alcohols. Likewise suitable are the polymerized ring opening products of cyclic ethers, for example, tetrahydrofuran, with corresponding alcohols as starter molecules. Using ester compounds, for example, oligoesters or polyesters, as starter molecules, the products are polyetheresters containing both ether and ester groups. The aforementioned compounds may likewise be used as a polyol component in the preparation of polyurethanes as may be used in the dispersions of the invention in the context of the present invention.

In one preferred embodiment of the present invention, the alkoxylation products, especially the ethoxylation or propoxylation products, of difunctional or trifunctional alcohols are used as polyetherpolyols in the preparation of polyurethanes, As difunctional or trifunctional alcohols, use is made in particular of alcohols selected from the group consisting of ethylene glycol, diethylene glycol, triethylene glycol, 1,2-propanediol, dipropylene glycol, the isomeric butanediols, hexanediols, octanediols, technical mixtures of hydroxy fatty alcohols having from 14 to 22 C atoms, especially hydroxystearyl alcohol, tri-methylolpropane or glycerol or mixtures of two or more of said alcohols.

In a further preferred embodiment of the invention, the polyurethanes are prepared using polyols having an average molecular weight of from about 300 to about 80,000, in particular from about 1000 to about 40,000. Good properties for the resultant dispersions of the invention come about, for example, through the use of OH-terminated, linear polyols, examples being mixtures of two or more polyols containing, at least proportionately, polypropylene glycol having a molecular weight of from about 2000 to 30,000.

In one preferred embodiment of the present invention, the OH-terminated polyols used for preparing the polyurethanes contain polypropylene glycol having an average molecular weight of from about 2000 to about 40,000 in a proportion of more than 50% by weight, preferably more than 70% by weight, based on the overall polyol mixture. In another embodiment of the invention, it is also possible to use mixtures of different polypropylene glycols having different molecular weights.

Referring to the abovementioned polyols it is also possible as building block b) to make proportional use, preferably in minor amounts, of linear or branched, saturated or unsaturated aliphatic, monofunctional alcohols, especially methanol, ethanol, the isomers of propanol, butanol or hexanol, and fatty alcohols having from about 8 to about 22 C atoms, examples being octanol, decanol, dodecanol, tetradecanol, hexadecanol and octadecanol. Said fatty alcohols are obtainable, for example, by reducing natural fatty acids and may be used both as clear substances and in the form of their technical mixtures. Highly suitable, for example, are linear monoalcohols and especially those having from about 4 to about 18 C atoms. Instead of the linear or branched aliphatic alcohols or in a blend with them it is also possible to use monoalkyl polyether alcohols of different molecular weights, preferably in the molecular weight ranges from about 1000 to about 2000.

Likewise possible for use as building block b) are polyhydric alcohols, as obtainable, for example, by hydrogenating dimeric or oligomeric fatty acids or their esters, castor oil, with $C_{1-4}$ alkyl alcohols, ring-opened, epoxidized fats or oils, $C_{12-18}$ fatty acid diethanolamides, monoglycerides of aliphatic $C_{8-22}$ fatty acids, polypropylene glycols or polysiloxanes containing terminal OH groups, or mixtures of two or more of said compounds.

The preparation of polyhydric alcohols by hydrogenating dimeric or oligomeric fatty acids or their esters may take place, for example, in accordance with DE 17 68 313. Suitable starting materials include polymerization products of monofunctional or polyfunctional, mono- or polyunsaturated fatty acids or their esters, or mixtures of two or more thereof. These, if desired, may comprise saturated components as well as unsaturated components. They include, for example, the polymerization products of oleic acid, linoleic acid, linolenic acid, palmitoleic acid, elaidic acid or erucic acid or of esters prepared from said fatty acids and preferably lower aliphatic alcohols ($C_{1-4}$ alcohols) or of fatty acid mixtures obtained from fats or oils such as talc, olive oil, sunflower oil, soya oil or cottonseed oil. Depending on the chosen reaction conditions, the products formed during the polymerizations conducted in accordance with known techniques include not only dimers but also varying amounts of monomeric and oligomeric fatty acids or fatty acid esters. Where the polymerization products include relatively large amounts of monomeric fatty acids or their esters, it may be judicious to separate these off by distillation, as alcoholic monomer constituents, only after the hydrogenation. The hydrogenation of dimeric or oligomeric fatty acids and their esters are conducted, for example, in the presence of copper- or zinc-containing catalysts in customary, continuously operating pressure hydrogenation apparatuses with a gas circulation.

Expoxidized fats or oils ring-opened with $C_{1-4}$ alkyl alcohols may be prepared from fats or oils containing high levels of unsaturated fatty acid constituents, for example, olive oil, soya oil or sunflower oil, in a manner known per se. For this purpose, fats or oils, in accordance for example with the technique described in DE-C 857 364, are epoxidized by reaction with peracetic acid in the presence of acidic catalysts or with performic acid formed in situ from formic acid and hydrogen peroxide. Subsequently, the oxirane rings of the epoxidized fats or oils are split open with low molecular mass alcohols, for example, methanol, ethanol, propanol or butanol, accompanied by the formation of OH groups.

$C_{12-18}$ fatty acid diethanolamides, preparable by reacting $C_{12-18}$ fatty acids such as lauric acid, myristic acid, coconut fatty acid or oleic acid with diethanolamine (see, for example, Kirk-Othmer: "Encyclopaedia of Chemical Technology, Volume 22, pages 373–376, John Wiley and Sons, New York 1983), and also monoglycerides of $C_{8-22}$ fatty acids, preparable by reacting fats or oils with glycerol, for example, lauric acid, coconut fatty acid, stearic acid, oleic acid or tallow fatty acid monoglycerides (see Kirk-Othmer: "Encyclopaedia of Chemical Technology, Volume 22, pages 367–368, John Wiley and Sons, New York 1983), are commercially customary products and may likewise be used as component b), or at least as a constituent thereof, in the preparation of the polyurethanes. Polysiloxanes containing terminal OH groups are offered, for example, by the company Wacker and polypropylene glycols, for example, by the company Dow Chemicals.

Examples of suitable chain extenders, as may be used in the context of the present invention for preparing the polyurethanes as building block d), include polyhydric alcohols such as ethylene glycol, propylene glycol, propane-1,3-diol, butane-1,4-diol, hexarie-1,6-diol, trimethylolpropane, glycerol, pentaerythritol, sorbitol, mannitol or glucose. Low molecular mass polyesterdiols as well, such as succinic, glutaric or adipic bis(hydroxyethyl) esters, or a mixture of two or more thereof, or low molecular mass diols containing ether groups, such as diethylene glycol, triethylene glycol, tetraethylene glycol, dipropylene glycol, tripropylene glycol or tetrapropylene glycol, may additionally be used as building block d). Likewise suitable are amines such as ethylenediamine, hexamethylenediamine, piperazine, 2,5-dimethylpiperazine, 1-amino-3-aminomethyl-3,5,5-trimethylcyclohexane (isophoronediamine, IPDA), 4,4'-diamino-dicyclohexylmethane, 1,4-diaminocyclohexane, 1,2-diaminopropane, hydrazine, hydrazine hydrate, amino acid hydrazides such as 2-aminoacetic hydrazide or bishydrazides such as succinic bishydrazide. The amine-type and hydrazine-type building blocks d) which contain no tertiary nitrogen may also be used in blocked form, i.e., in the form of the corresponding ketimines, ketazines or amine salts, to prepare the polyurethanes. Oxazolidines constitute masked diamines which may be used to prepare the polyurethanes. The additional use, in minor fractions, of compounds having a functionality of three or more in the sense of an isocyanate polyaddition reaction is also possible, in order to achieve a certain degree of branching, as is the possible additional use, already mentioned, of polyisocyanates with a functionality of three or more, for the same purpose. Monohydric alcohols such as n-butanol or n-dodecanol and stearyl alcohol may be used additionally in minor amounts as a fraction of building block b).

In the case of the alkoxysilane of the general formula II that may be used as building block c), X is, for example, a radical containing at least one OH, SH, $NH_2$ or anhydride group. In one preferred embodiment of the invention, X is OH, SH, $H_2N$—$(CH_2)_2$—NH, (HO—$C_2H_4)_2$N or $NH_2$, A is $CH_2$, $CH_2$—$CH_2$ or $CH_2$—$CH_2$—$CH_2$, Z is —$CH_3$ or —$CH_2$—$CH_3$, and R is —$CH_3$, —$CH_2$—$CH_3$ or —$CH_2$—$CH_2$—$CH_3$. The variable n in one preferred embodiment of the invention is 0 or 1.

Examples of starting materials suitable as building block c) are $H_2N-(CH_2)_3-Si(O-CH_2-CH_3)_3$, $HO-CH(CH_3)-CH_2-Si(OCH_3)_3$, $HO-(CH_2)_3-Si(O-CH_3)_3$, $HO-CH_2-CH_2-O-CH_2-CH_2-Si(OCH_3)$, $(HO-C_2H_4)_2N-(CH_2)_3-Si(O-CH_3)_3$, $HO-(C_2H_4-O)_3-C_2H_4-N(CH_3)-(CH_2)_3-Si(O-C_4H_9)_3$, $H_2N-CH_2-C_6H_4-CH_2-CH_2-Si(O-CH_3)_3$, $HS-(CH_2)_3-Si(O-CH_3)_3$, $H_2N-(CH_2)_3NH-(CH_2)_3-Si(OCH_3)_3$, $H_2N-CH_2-CH_2-NH-(CH_2)_2-Si(O-CH_3)_3$, $H_2N-(CH_2)_2-NH-(CH_2)_3-Si(OCH_3)_3$, $HO-CH(C_2H_5)-CH_2-Si(OC_2H_5)_3$, $HO-(CH_2)_3-Si(O-C_2H_5)_3$, $HO-CH_2-CH_2-O-CH_2-Si(OC_2H_5)_3$, $(HO-C_2H_4)_2-N-(CH_2)_3-Si(O-C_2H_5)_3$, $H_2N-CH_2-C_6H_4-CH_2-CH_2-Si(O-C_2H_5)_3$, $HS-(CH_2)_3-Si(O-C_2H_5)_3$, $H_2N-(CH_2)_3-NH-(CH_2)_3-Si(OC_2H_5)_3$, $H_2N-CH_2-CH_2-NH-(CH_2)_2-Si(O-C_2H_5)_3$, $H_2N-(CH_2)_2-NH-(CH_2)_3-Si(OC_2H_5)_3$.

The reaction of the building block a) may take place in the presence of an organic, for example, water-miscible inert solvent such as acetone or N-methylpyrrolidone. Said solvent is generally removed by distillation following the transfer of the polyurethane to the aqueous phase, i.e., following dispersion. Advantageously, however, the polyurethane is prepared without solvent.

For this purpose, first of all the building block a) is reacted with the building block (b) (polyol component) to give a polyurethane prepolymer containing termnal NCO groups. Subsequently, all or only some of the NCO groups of the prepolymer are reacted with the alkoxysilane building block c). Thereafter, the alkoxysilane-terminated polyurethane prepolynmer, which may at the same time also possess free NCO groups, is transferred to the aqueous phase by addition of water, which if desired may additionally include a chain extender. The temperature of the reaction in the first stage is situated generally at from about 5 to about 160° C., preferably at from about 50 to about 120° C. The reaction of the prepolymer with the alkoxysilane is conducted at from about 50 to about 120° C. For the conversion of the alkoxysilane-terminated polyurethane into the aqueous dispersion, there should advantageously be an emulsifier or a mixture of two or more emulsifiers in the polyurethane or in the water. In this context it is possible to use anionic, cationic, nonionic or ampholytic emulsifiers or mixtures of two or more of these emulsifiers. Examples of anionic emulsifiers are alkyl sulfates, especially those having a chain length of from about 8 to about 18 C atoms, alkyl and alkaryl ether sulfates having from about 8 to about 18 C atoms in the hydrophobic radical and from 1 to about 40 ethylene oxide (EO) or propylene oxide (PO) units, or the mixture thereof, in the hydrophilic portion of the molecule, sulfonates, especially alkylsulfonates, having from about 8 to about 18 C atoms, alkylarylsulfonates having from about 8 to about 18 C atoms, taurides, esters and monoesters of sulfosuccinic acid with monohydric alcohols or alkylphenols having from 4 to about 15 C atoms, which, if desired, may have been ethoxylated with from 1 to about 40 EO units, alkali metal salts and ammonium salts of carboxylic acids, for example, of fatty acids or resin acids having from about 8 to about 32 C atoms, or mixtures thereof, phosphoric acid partial esters and the alkali metal salts and ammonium salts thereof.

In one preferred embodiment of the invention, anionic emulsifiers used comprise alkyl and alkaryl phosphates having from about 8 to about 22 C atoms in the organic radical, alkyl ether phosphates or alkaryl ether phosphates having from about 8 to about 22 C atoms in the alkyl or alkaryl radical, respectively, and from 1 to about 40 EO units.

Examples of nonionic emulsifiers are polyvinyl alcohol further containing from 5 to about 50%, for example, from about 8 to about 20%, of acetate units and having a degree of polymerization of from about 200 to about 5000, alkyl polyglycol ethers, preferably those containing from about 8 to about 40 EO units and alkyl radicals having from about 8 to about 20 C atoms, alkylaryl polyglycol ethers, preferably those containing from about 8 to about 40 EO units and from about 8 to about 20 C atoms in the alkyl or aryl radicals, ethylene oxide/propylene oxide (EO/PO) block copolymers, preferably those containing from about 8 to about 40 EO and/or PO units, adducts of alkylamines having alkyl radicals of from about 8 to about 22 C atoms with ethylene oxide or propylene oxide, fatty acids and resin acids, having from about 6 to about 32 C atoms, alkyl polyglycosides containing linear or branched, saturated or unsaturated alkyl radicals having on average from about 8 to about 24 C atoms and an oligoglycoside radical with from about 1 to about 10 hexose or pentose units on average, or mixtures of two or more thereof, natural substances and derivatives thereof such as lecithin, lanolin, sarcosine, cellulose, cellulose alkyl ethers and carboxyalkyl-celluloses, whose alkyl groups each have from 1 to about 4 C atoms, linear organo(poly)siloxanes containing polar groups, especially those containing alkoxy groups having up to about 24 C atoms and up to about 40 EO or PO groups.

Examples of cationic emulsifiers are salts of primary, secondary or tertiary fatty amines having from about 8 to about 24 C atoms with acetic acid, sulfuric acid, hydrochloric acid or phosphoric acids, quaternary alkyl- and alkyl-benzeneammonium salts, especially those whose alkyl groups have from about 6 to about 24 C atoms, in particular the halides, sulfates, phosphates or acetates, or mixtures of two or more thereof, alkylpyridinium, alkylimidazolinium or alkyloxazol-idinium salts, especially those whose alkyl chain contains up to about 18 C atoms, examples being the halides, sulfates, phosphates or acetates, or a mixture of two or more thereof.

Examples of ampholytic emulsifiers are amino acids with long-chain substituents, such as N-alkyl-di(amino-ethyl) glycine or N-alkyl-2-aminopropionic salts, betaines, such as N-(3-acylamidopropyl)-N,N-dimethylammonium salts with a $C_{8-18}$ acyl radical, or alkylimidazolium betaines.

In one preferred embodiment of the present invention, the following emulsifiers are used: the alkali metal salts, especially the Na salt, of $C_{12/14}$ fatty alcohol ether sulfates, alkylphenol ether sulfates, especially their alkali metal salts or $NH_4$ salts, Na n-dodecyl sulfate, di-K-oleic acid sulfonate $(C_{18})$, Na n-alkyl-$(C_{10}C_{13})$-benzenesulfonate, Na 2-ethylhexyl sulfate, $NH_4$ lauryl sulfate $(C_{8/14})$, Na lauryl sulfate $(C_{12/14})$, Na lauryl sulfate $(C_{2/16})$, Na lauryl sulfate $(C_{12/18})$, Na cetylstearyl sulfate $(C_{16/18})$, Na oleylcetyl sulfate $(C_{16/18})$, nonylphenol ethoxylates, octylphenol ethoxylates, $C_{12/14}$ fatty alcohol ethoxylates, oleylcetyl ethoxylates, $C_{16/18}$ fatty alcohol ethoxylates, cetylstearyl ethoxylates, ethoxylated triglycerides, sorbitan monolaurate, sorbitan monooleate, sorbitan 20EO monooleate, sorbitan 20EO monostearate, sulfosuccinic acid monoester di-Na salt, fatty alcohol sulfosuccinate di-Na salt, dialkylsulfosuccinate Na salt or di-Na sulfosuccinamate, or mixtures of two or more thereof. It is likewise possible to use mixtures of anionic and nonionic surfactants, mixtures of nonionic surfactants, alkylaryl ether phosphates and their acidic esters, dihydroxystearic acid $NH_4$ salt, isoeicosanol, aryl polyglycol ethers, glycerol monostearate.

In another preferred embodiment of the present invention, a polyester or a polycarbonate is used as organic polymer.

Suitable polyesters or polycarbonates are all polyesters or polycarbonates having a molecular weight of at least about 200 g/mol. The preparation of such polyesters and polycarbonates is known to the skilled worker.

In one preferred embodiment of the present invention, the organic polymer used comprises a polyester or a mixture of two or more polyesters or a mixture of one or more polyesters and a polyether or a mixture of two or more polyethers. Suitable polyesters may be prepared, for example, by reacting OH-carrying polyesterpolyols with appropriately functionalized alkoxysilane compounds of the general formula III

(III)

in which Y is a radical containing at least one OH-reactive functional group, for example, at least one NCO group, halide group, oxirane group, acid anhydride group or acid halide group, and A, Z, R and n are as already defined above.

Suitable polyesterpolyols are obtainable, for example, by reacting dicarboxylic acids with diols or higher polyols or a mixture of diols and higher polyols or an excess of diols or higher polyols or their mixture, and also by ring-opening epoxidized esters, for example, epoxidized fatty acid esters, with alcohols. Polycaprolactonediols as well, preparable for example from ε-caprolactone and diols or higher polyols, are suitable as polyesterpolyols. In the context of the present invention it is possible, for example, to use polyesterpolyols obtainable from low molecular mass dicarboxylic acids such as succinic acid, glutaric acid, adipic acid, isophthalic acid, terephthalic acid or phthalic acid, or a mixture of two or more thereof, with an excess of linear or branched, saturated or unsaturated aliphatic diols having from about 2 to about 12 carbon atoms. During the preparation of the polyesterpolyols, it is also possible if desired for there to be a small fraction of alcohols of higher functionality, examples of which include glycerol, trimethylolpropane, triethylolpropane, pentaerythritol or sugar alcohols, such as sorbitol, mannitol or glucose.

Polyesterpolyols suitable in one preferred embodiment of the present invention are substantially linear and have, for example, a molecular weight of from about 1000 to about 50,000 and also an OH number of from about 10 to about 200, for example, from about 20 to about 80. Suitable polyesterpolyols available commercially are, for example, DESMOPHEN-2020-E, DESMOPHEN-C-200, BAYCOLL-AD-2052 (manufacturer: Bayer AG) or RAVECARB-106 or 107 (manufacturer: Enichem), or mixtures of two or more thereof.

Suitable alkoxysilane compounds of the general formula III are, for example, Cl—(CH$_2$)$_3$—Si(O—CH$_2$—CH$_3$)$_3$, Cl—CH(CH$_3$)—CH$_2$—Si(OCH$_3$)$_3$, Cl—(CH$_2$)$_3$—Si(O—CH$_3$)$_3$, Cl—CH$_2$—CH$_2$—O—CH$_2$—CH$_2$—Si(OCH$_3$), (OCN—C$_2$H$_4$)$_2$N—(CH$_2$)$_3$—Si(O—CH$_3$)$_3$, OCN—(C$_2$H$_4$—O)$_3$—C$_2$H$_4$—N(CH$_3$)—(CH$_2$)$_3$—Si(O—C$_4$H$_9$)$_3$, Br—CH$_2$—C$_6$H$_4$—CH$_2$—CH$_2$—Si(O—CH$_3$)$_3$, Br—(CH$_2$)$_3$—Si(O—CH$_3$)$_3$, Cl—CH(C$_2$H$_5$)—CH$_2$—Si(OC$_2$H$_5$)$_3$, Cl—(CH$_2$)$_3$—Si(O—C$_2$H$_5$)$_3$, Br—(CH$_2$)$_3$—Si(O—C$_2$H$_5$)$_3$, —OCN—(CH$_2$)$_3$—Si(O—C$_2$H$_5$)$_3$, Cl—CH$_2$—CH$_2$—O—CH$_2$—Si(OC$_2$H$_5$)$_3$, (OCN—C$_2$H$_4$)$_2$—N—(CH$_2$)$_3$—Si(O—C$_2$H$_5$)$_3$ or Cl—CH$_2$—C$_6$H$_4$—CH$_2$—CH$_2$—Si(O—C$_2$H$_5$)$_3$, or compounds having an oxirane group or anhydride group, for example, at the appropriate point, such as (3-triethoxysilylpropyl)succinic anhydride.

Likewise suitable are corresponding alkoxysilane compounds of the general formula III which have more than one OH-reactive functional group. Examples include OCN—CH$_2$—CH(NCO)—(CH$_2$)$_3$—Si(O—CH$_2$—CH$_3$)$_3$, OCN—CH—(CH$_2$NCO)—CH$_2$—Si(OCH$_3$)$_3$, Cl—CH$_2$—CH(Cl)—(CH$_2$)$_3$—Si(O—CH$_2$—CH$_3$)$_3$, Cl—CH—(CH$_2$Cl)—CH$_2$—Si(OCH$_3$)$_3$, Cl—CH$_2$CH(Cl)—CH$_2$—CH$_2$—O—CH$_2$—CH$_2$—Si(OCH$_3$), (Cl—C$_2$H$_4$)$_2$N—(CH$_2$)$_3$—Si(O—CH$_3$)$_3$, Cl—CH(C$_2$H$_4$Cl)—CH$_2$—Si(OC$_2$H$_5$)$_3$ or compounds which have an oxirane group or anhydride group, for example, at the appropriate point.

In one preferred embodiment of the present invention, the polycarbonates or polyesters containing silane groups are converted into the dispersions of the invention by dispersing them in water. If the all polyesters or polycarbonates have no water-dissociating groups, i.e., are not soluble or "self-dispersing", it is advantageous if one of the emulsifers already mentioned above, or a mixture of two or more of said emulsifiers, is present in the water.

In another preferred embodiment, polyethers are used as organic polymers. The polyethers that are suitable in the context of the present invention include the alkylene oxide adducts of appropriate starter compounds, examples being water, ethylene glycol, diethylene glycol, propylene glycol, dipropylene glycol, glycerol, 1,2,6-hexanetriol, 1,1,1-trimethylolethane, trimethylolpropane, pentaerytiritol, sorbitol, mannitol or glucose, or higher polysaccharides. In one preferred embodiment of the invention, polyethers are used which are prepared by polyaddition of ethylene oxide or propylene oxide or their mixture onto the aforementioned starter compounds, especially the adducts of propylene oxide. Suitable polyethers are described, for example, in EP-B 0 184 829 and the documents cited therein, which, insofar as they relate to polyethers, are part of the disclosure content of the present text.

In one preferred embodiment of the invention, the polyethers have a molecular weight of from about 300 to about 80,000. In a preferred embodiment of the invention, the polyethers used have a viscosity (23° C., DVU-E-type, spindel 9) of from about 0.5 to about 30 Pa*s and a pH of from about 5 to about 9. In a temperature range of from about 0° C. to about 80° C., the polyethers used with preference have a viscosity of from about 0.1 to about 120 Pa*s.

The silane-terminated polyethers are prepared accordingly by reacting the polyetherpolyols with appropriately functionalized silanes. Examples of suitable silanes are the alkoxysilane compounds of the general formula III that have already been mentioned above. Suitable silane-terminated polyethers are sold, for example, by the company Kaneka under the name MS Polymer®.

Likewise suitable in the context of the present invention are polyethers containing amino groups (for example, JEFFAMINE polyethers) and silyl groups which have a functionality of from about 2 to about 6 and a molecular weight of from about 500 to about 50,000, for example, from about 1000 to about 20,000.

In another preferred embodiment of the invention, polyamides are used as organic polymers. Polyamides may be prepared conventionally by reacting dicarboxylic acids with diamines. Suitable dicarboxylic acids are, for example, the dicarboxylic acids already mentioned in this text and suitable for preparing polyesters, especially the dimer fatty acids. In one preferred embodiment of the present invention, polyamides are used which are obtainable by reacting dimer fattyacids or their alkyl esters with alcohols having from 1 to about 6 C atoms and. alkylenediamines, in particular alkylenediarnines having from 2 to about 10 C atomns.

Furnishing the polyamides with the corresponding alkoxysilane groups takes place in the manner already described above for polyethers or polyesters.

In a further preferred embodiment of the present invention, polyacrylates or polymethacrylates are used as organic polymers. Polyacrylates and polymethacrylates may be obtained in a manner known to the skilled worker, by free-radical polymerization of corresponding esters of acrylic acid or methacrylic acid. Suitable esters of acrylic acid or of methacrylic acid are, for example, the methyl esters, ethyl esters, propyl esters; butyl esters, pentyl esters, hexyl esters, heptyl esters, octyl esters, nonyl esters or decyl esters. Alkoxysilane groups may be introduced into the organic polymer by, for example, copolymerizing an appropriately functionalized alkoxysilane into the polymer chain, as described, for example, in EP-A 0 818 496, whose disclosure content is regarded as being part of the present text. It is, however, likewise possible to functionalize the organic polymer appropriately prior to introducing the alkoxysilane groups and then, in a polymer-analogous reaction, to react it with an appropriately functionalized alkoxysilane, an example being an alkoxysilane of the general formula III. This may be done, for example, by copolymerizing a certain percentage of hydroxy-functionalized acrylates or methacrylates in the organic polymer. Examples of monomers suitable for this purpose are the hydroxyethyl, hydroxypropyl, hydroxybutyl, hydroxypentyl, hydroxyhexyl, hydroxyheptyl or hydroxyoctyl esters of acrylic acid or methacrylic acid.

Likewise suitable for functionalizing polyacrylate esters or polymethacrylate esters with silyl groups is the grafting reaction. Grafting reactions are reactions in which graft polymers are formed. Graft polymers come about, for example, when olefinically unsaturated compounds are subjected to free-radically initiated reaction in the presence of pre-prepared polymers, which act as macroinitiators and hence at the same time as graft substrates. The initiation may be initiated, for example, by chemical, or thermal cleavage of peroxide groups or diazo groups on the polymer chain of the graft substrates and also by exposure to radiation.

The compounds used in the context of the present invention as polyacrylate esters or polymethacrylate esters with silyl groups have a molecular weight of at least about 200, for example, at least about 300 or at least about 500. In one preferred embodiment of the present invention, polyacrylate esters or polymethacrylate esters with silyl groups are used which have a molecular weight of less than about 1000, together together with one or more of the silyl-bearing polymers described in the context of the present text.

Likewise suitable in the context of the present invention are polyolefins such as polyethylene having at least one, for example, two or more, silyl groups.

Particularly suitable olefinically unsaturated silyl derivatives are the trialkoxyvinylsilanes.

In the formulations of the invention, said silyl-bearing polymers may be used alone or as a mixture of two or more thereof.

Dispersions of the aforementioned organic polymers may be prepared, for example, by corresponding dispersion of the polymers in water until the desired solids content is reached. In the case of certain systems, an example being acrylate dispersions or methacrylate dispersions, it is likewise possible to carry out the preparation of the polymers in an emulsion polymerization or dispersion polymerization and, by reducing the continuous phase, to raise the solids content of the resulting dispersion until the desired level of at least about 60% by weight is reached.

Examples of further suitable organic polymers are polybutadienes, as obtainable by polymerization of butadiene. Functionalization of the butadienes with alkoxysilane groups may take place in accordance with the methodology already mentioned in the context of the polyacrylates and polymethacrylates—by grafting reaction, for example.

In a further preferred embodiment of the present invention, the organic polymers used comprise derivatives of fatty substances, especially of fatty acid esters, as already described above.

Fatty substances with silyl groups, as used in the dispersions of the invention, may be obtained, for example, by reaction of silanes with unsaturated fatty substances, for example, with rapeseed oil, soya oil, linseed oil, rapeseed fatty acid methyl ester. Corresponding fatty substances, and a suitable process for their preparation, is described, for example, in DE-A 42 09 325, whose disclosure content is considered part of the present text. Furthermore, fatty substances with silyl groups may be obtained by reacting appropriately functionalized fatty substances such as castor oil, maleic anhydride (MAn)-grafted triglycerides or epoxidized triglycerides with a suitably functionalized compound of the general formulae II or III.

In another preferred embodiment of the present invention, polysiloxanes are used as organic polymers. Suitable polysiloxanes are, for example, described in DE-A 36 37 836 or in DE-C 195 07 416, whose disclosure content in each case is regarded as being part of the disclosure content of the present text.

Examples of polymers which contain silane groups, are suitable in accordance with the invention and are obtainable commercially are DESMOSEAL LS 2237 (manufacturer: Bayer AG) or WITTON WSP-725 (manufacturer: Witton Chemical Co. Ltd.), KANEKA S 203, KANEKA MAX 450, KANEKA MAX 500, HANSE CHEMIE Polymer ST 50, HANSE CHEMIE Polymer OM 53, WITTON 627 or WITTON 725/80.

In one preferred embodiment of the invention, the dispersion of the invention contains more than about 60% by weight of the polymer which bears silane groups, for example, at least about 65, at least about 70, at least about 75 or at least about 80% by weight. In special cases, the amount of the polymer which bears silane groups may also be above stated levels, for example, at at least about 85 or 90% by weight.

In the context of the present invention, the abovementioned organic polymers may be used alone in the dispersion of the invention. It is, however, likewise possible to use the aforementioned polymers in dispersions which comprise, besides the polymer containing silane groups, at least one further organic polymer or a mixture of two or more further organic polymer. Such a polymer dispersion of the invention has the advantage over conventional polymer dispersions that even a small fraction of alkoxysilane-terminated polymers imparts markedly improved water resistance to surface coatings, adhesive bonds or seals.

The invention therefore additionally provides a polymer dispersion comprising water and at least one first organic polymer containing at least one group of the general formula I $$—A—Si(Z)_n(OH)_{3-n} \qquad (I)$$

in which A is $CH_2$ or is a linear or branched, saturated or unsaturated alkylene radical having from 2 to about 12 C atoms or is an arylene radical having from about 6 to about 18 C atoms or an arylenealkylene radical having from about 7 to about 19 C atoms, Z is $CH_3$, $O—CH_3$ or is a linear or branched, saturated or unsaturated alkyl radical or alkoxy radical having from 2 to about 12 C atoms, and n is 0, 1 or 2, or a condensation product of at least two such groups, and also a further organic polymer or a mixture of two or more further organic polymers.

In one preferred embodiment of the invention, the first organic polymer used is a polymer selected from the group consisting of polyurethanes, polyesters, polyamides, polyethers, polyacrylates, polymethacrylates, polystyrene, polybutadienes, polyethylene, polyvinyl esters, ethylene/α-olefin copolymers, styrene/butadiene copolymers or ethylene/vinyl acetate copolymers, as already described above.

In a further preferred embodiment of the present invention, the total fraction of organic polymers in the dispersion is at least about 60% by weight. In another preferred embodiment of the invention, the fraction of alkoxysilane-terminated polymers is at least about 2% by weight, based on the total polymer content of the dispersion. However, the fraction may also be higher, for example, at at least about 5 or about 10% by weight, at least about 20% by weight, at least about 30% by weight or at least about 40% by weight or more. Based on the total fraction of organic polymers in the dispersion, the fraction of the first organic polymer is from about 1 to about 99% by weight.

The dispersions of the invention are generally prepared by introducing the alkoxysilyl-bearing organic polymer into water as the continuous phase, or by adding water to the corresponding alkoxysilyl-bearirig organic polymer or to the mixture of two or more polymers, at least one of the polymers bearing an alkoxysilyl group.

In a preferred embodiment of the invention, the silyl-bearing polymers may be used in a mixture of one or more water-soluble ionic or nonionic polymers. Examples of such polymers are polyacrylates, polymethacrylates, polyacrylamides, polyvinyl alcohol and also cellulose, soluble starch and derivatives thereof. Suitable examples include nonionic cellulose ethers, for example, methylcellulose, ethylcellulose, hydroxyethylcellulose, hydroxypropylcellulose and the like. Furthermore, it is possible for the cellulose derivatives to be alkoxylated, with a degree of alkoxylation of, for example, from about 0.05 to 100.

Suitable water-soluble starch derivatives include all correspondingly modified natural starch types, examples including starch from potatoes, corn, wheat, rice and the like, with derivatives based on potato starch and/or corn starch being particularly suitable.

Likewise suitable is polyvinyl alcohol; optionally copolymerized with further ethylenically unsaturated monomers, such as with vinyl acetate, for example. If water-insoluble monomers are copolymerized as comonomers, their amount in the copolymer is limited by the consideration that the resulting copolymer must still be soluble in water.

Likewise suitable are water-soluble proteins, as obtainable, for example, by the partial hydrolysis of vegetable or animal proteinaceous fibers. Particularly suitable in this context are casein, soya protein, and their water-soluble derivatives.

The introduction of alkoxysilyl-bearing compounds into water is generally accompanied by substantially complete hydrolysis of the alkoxysilyl groups to hydroxysilyl groups. Accordingly, the dispersions of the invention no longer contain any, or substantially any, alkoxysilane groups. If appropriate, in the dispersion following the hydrolysis, there may to a small extent be condensation of hydroxysilyl groups that are present in close spatial adjacency to one another. Such a condensation may take place either between hydroxysilyl groups on different polymer molecules; however, it is likewise possible for condensation to take place between hydroxysilyl groups on the same polymer molecule.

Hydrolysis properties and condensation properties of different alkoxysilane groups are described, for example, in "Silane Coupling Agents", $2^{nd}$ Edition, Plenum Press, New York, 1991, p. 55 ff., the disclosure content of said reference being considered part of the disclosure content of the present text.

In addition to the abovementioned constituents, the polymer dispersions of the invention may further comprise one or more additives.

Examples of suitable additives include stabilizers, defoamers, antioxidants, light stabilizers, pigment dispersants, fillers, low molecular mass silanes as adhesion promoters, resins, waxes, tackifiers, pH regulators, plasticizers, dyes, including indicator dyes, microbiocides, and the like.

Suitable low molecular mass silanes are compounds having a molecular weight of less than about 200 which contain one or more silane groups. The low molecular mass silanes may be added to the formulation of the invention either before the emulsion of the prepolymer in water or after the emulsification in the form, for example, of an emulsion of low molecular mass silanes in water.

The formulation of the invention may contain up to about 20% by weight of customary tackifiers. Examples of suitable tackifiers are resins, terpene oligomers, coumarone/indene resins, aliphatic, petrochemical resins, and modified phenolic resins. Examples of those suitable in the context of the present invention are hydrocarbon resins as obtained by polymerization of terpenes, primarily a- or b-pinene, dipentene or limonene. The polymerization of these polymers is generally carried out cationically with initiation by Friedel-Crafts catalysts. The terpene resins also include, for example, copolymers of terpenes and other monomers, for example, styrene, α-methylstyrene, isoprene and the like. Said resins find use, for example, as tackifiers for pressure-sensitive adhesives and coating materials. Likewise suitable are the terpene-phenolic resins, which are prepared by acid-catalyzed addition of phenols to terpenes or rosin. Terpene-phenolic resins are soluble in the majority of organic solvents and oils and are miscible with other resins, waxes, and rubber. Likewise suitable as an additive in the above sense in the context of the present invention are the rosins and their derivatives, such as their esters or alcohols, for example.

The pH regulators include, in principle, all organic and inorganic acids and bases which do not adversely affect the stability of the polymer dispersion of the invention. Suitable for setting basic pH levels (pH>7), for example, is sodium hydrogen carbonate; in one preferred embodiment, acidic pH levels (pH<7) are set using p-toluenesulfonic acid. The polymer dispersion of the invention comprises the pH regulators, where appropriate, in an amount of up to about 5% by weight, for example, from about 0.05 to about 3% by weight or from about 0.1 to about 2% by weight, based on the total dispersion.

Examples of suitable plasticizers are esters such as abietic esters, adipic esters, azelaic esters, benzoic esters, butyric esters, acetic esters, esters of higher fatty acids having from about 8 to about 44 C atoms, esters of OH-bearing or epoxidized fatty acids, fatty acid esters and fats, glycolic esters, phosphoric esters, phthalic esters, of linear or branched alcohols containing 1 to 12 C atoms, propionic esters, sebacic esters, sulfonic esters, thiobutyric esters, trimellitic esters, citric esters, and also esters based on nitrocellulose and polyvinyl acetate, and also mixtures of two or more thereof. Particularly suitable are the asymmetric esters of the difunctional, aliphatic dicarboxylic acids, an example being the esterification product of monooctyl adipate with 2-ethylhexanol (EDENOL DOA, Henkel, Düsseldorf).

Likewise suitable as plasticizers are the straight or mixed ethers of monofunctional, linear or branched $C_{4-16}$ alcohols or mixtures of two or more different ethers of such alcohols, for example, dioctyl ethers (obtainable as CETIOL OE, Henkel, Düsseldorf).

In another preferred embodiment, endgroup-capped polyethylene glycols are used as plasticizers. Examples are polyethylene or polypropylene glycol di-$C_{1-4}$ alkyl ethers, especially the dimethyl or diethyl ethers of diethylene glycol or dipropylene glycol, and also mixtures of two or more thereof.

Likewise suitable as plasticizers in the context of the present invention are diurethanes. Diurethanes may be prepared, for example, by reacting diols having OH end groups with monofunctional isocyanates, and by choosing the stoichiometry such that substantially all of the free OH groups are consumed by reaction. Any excess isocyanate may subsequently be removed, for example, by distillation from the reaction mixture. Another method of preparing diurethanes comprises reacting monofunctional alcohols with diisocyanates, where as far as possible all of the NCO groups are consumed by reaction.

To prepare the diurethanes based on diols it is C) possible to use diols having from 2 to about 22 C atoms, examples being ethylene glycol, propylene glycol, 1,2-propanediol, dibutanediol, hexanediol, octanediol or technical mixtures of hydroxy fatty alcohols having about 14 C atoms, especially hydroxystearyl alcohol. Preference is given to linear diol mixtures, especially those containing polypropylene glycol having an average molecular weight ($M_n$) of from about 1000 to about 6000 in amounts of more than about 50% by weight, in particular more than about 70% by weight. Very particular preference is given to diurethanes exclusively based on propylene glycol having identical or different average molecular weights of from about 1000 to about 4000. The free OH groups of the diol mixtures are substantially all consumed by reaction with aromatic or aliphatic monoisocyanates or their mixtures. Preferred monoisocyanates are phenylisocyanate or tolylene isocyanate or mixtures thereof.

To prepare the diurethanes based on diisocyanates, aromatic or aliphatic diisocyanates or mixtures thereof are used. Suitable examples of aromatic or aliphatic diisocyanates are the isocyanates said above to be suitable for preparing the polyurethane of the invention, preferably tolylene diisocyanate (TDI). The free NCO groups of the diisocyanates are substantially reacted completely with monofunctional alcohols, preferably linear monofunctional alcohols or mixtures of two or more different monofunctional alcohols. Mixtures of linear monofunctional alcohols are particularly suitable. Examples of suitable monoalcohols are those having from 1 to about 24 C atoms, such as methanol, ethanol, the positional isomers of propanol, butanol, pentanol, hexanol, heptanol, octanol, decanol or dodecanol, especially the respective 1-hydroxy compounds, and also mixtures of two or more thereof. Likewise suitable are so-called "technical mixtures" of alcohols and endgroup-capped polyalkylene glycol ethers. Particularly suitable are alcohol mixtures containing polypropylene glycol monoalkyl ethers having an average molecular weight ($M_n$) of from about 200 to about 2000 in an amount of more than about 50% by weight, preferably more than about 70% by weight, based on the alcohol mixture. Particular preference is given to diurethanes based on diisocyanates whose free NCO groups have all been reacted by means of polypropylene glycol monoalkyl ether having an average molecular weight of from about 500 to about 2000.

The formulation of the invention comprises the aforementioned plasticizers generally in an amount such that the viscosity of the formulation at the time of dispersion is not more than about 200,000 mPas (Brookfield RVT, spindel 7, 2.5 rpm) at a temperature of from about 1° C. to about 140° C., in particular at from about 20° C. to about 99° C., for example, at about 23° C. In the context of the present invention, suitable plasticizers are, for example, all of the building blocks used for the context of the preparation of the silane-terminated polymers.

The formulation of the invention may further comprise up to about 7% by weight, in particular up to about 5% by weight of antioxidants.

The formulation of the invention may further comprise up to about 5% by weight of catalysts for controlling the cure rate. Examples of suitable catalysts are organometallic compounds such as iron compounds or tin compounds, especially the 1,3-dicarbonyl compounds of iron or of divalent or tetravalent tin, especially the Sn(II) carboxylates and/or the dialkyl-Sn(IV) dicarboxylates or the corresponding dialkoxylates, examples being dibutyltin dilaurate, dibutyltin diacetate, dioctyltin diacetate, dibutyltin maleate, tin(II) octoate, tin(II) phenolate or the acetylacetonates of divalent and/or tetravalent tin.

The formulation of the invention may comprise up to about 30% by weight, for example, up to about 20% by weight, of fillers. Examples of suitable fillers are inorganic compounds inert to isocyanates and silanes, such as chalk, lime powder, precipitated silica, pyrogenic silica, zeolites, bentonites, ground minerals, glass beads, ground glass, glass fibers, including short-cut glass fibers, and other inorganic fillers known to the skilled worker, and also organic fillers, especially short-cut fibers or hollow plastic beads. If desired, fillers may be used which impart thixotropy to the formulation, examples being swellable plastics such as PVC.

The formulation of the invention may contain up to about 2% by weight, preferably up to about 1% by weight, of UV stabilizers. Particularly suitable UV stabilizers are the so-called hindered amine light stabilizators (HALS). In the context of the present invention it is preferred to use a UV stabilizer which carries one silane group and which is incorporated into the end product in the course of crosslinlking and/or curing.

Particularly suitable for this purpose are the products LOWILITE 75, LOWILITE 77 (Great Lakes, USA).

The formulations of the invention may be prepared in a variety of ways. In general it is sufficient to disperse the silyl-bearing polymer, together if desired with a solvent, in the desired amount of water.

The invention therefore additionally provides a process for preparing a polymer dispersion as claimed in any of claims 1 to 6, which comprises dispersing in water at least one organic polymer containing at least one group of the general formula I $$—A—Si(Z)_n(OH)_{3-n} \quad (I)$$

in which A is $CH_2$ or is a linear or branched, saturated or unsaturated alkylene radical having from 2 to about 12 C atoms or is an arylene radical having from about 6 to about 18 C atoms or an arylenealkylene radical having from about 7 to about 19 C atoms, Z is $CH_3$, O—$CH_3$ or is a linear or branched, saturated or unsaturated alkyl radical or alkoxy radical having from 2 to about 12 C atoms, and n is 0, 1 or 2, or a condensation product of at least two such groups, during or after its preparation, together if desired with further organic polymers.

If, however, the silyl-bearing polymer is a polyurethane, then it is preferred in the context of the present invention first to disperse an NCO-bearing prepolymer in water and then to react a corresponding epoxysilane or an aminosilane in the dispersion with the prepolymer.

The polymer dispersions of the invention are suitable for a broad field of applications in the area of surface coatings, adhesives and sealants. The formulations of the invention are especially suitable, for example, as contact adhesives, one-part adhesives, two-part adhesives, structural adhesives, spray adhesives, adhesive sticks, sealing compounds, especially joint-sealing compounds, and for surface sealing.

The invention therefore additionally provides for the use of a polymer dispersion of the invention as an adhesive, sealing compound, surface coating composition, filling compound, or to produce moldings.

The polyurethanes of the invention or the formulations of the invention are suitable, for example, as adhesives for plastics, metals, mirrors, glass, ceramic, mineral substrates, wood, leather, textiles, paper, cardboard and rubber, it being possible to bond the materials in each case with themselves or arbitrarily with one another.

In one preferred embodiment of the invention, the formulations of the invention are formulated, for example, as spray adhesives. For this purpose, the formulation of the invention is introduced together with an appropriate propellant into a corresponding spray cartridge.

In another preferred embodiment of the present invention, the formulations of the invention are formulated as an adhesive stick. For this purpose, appropriate thickeners are mixed into the formulations of the invention. Examples of suitable thickeners are CARBOPOL 672 (BF Goodrich), SOFTISAN Gel (Contensio), AEROSIL (Degussa), SIPERNAT (Degussa), RILANIT HT extra (Henkel), RILANIT spez. Micro. (Henkel), CUTINA HR (Henkel), GENUVISCO carrageen TPH-1 (Hercules), KLUCEL MF (Hercules), MILLITHIX 925 (Milliken), RHEOLATE 204 (Rheox), DISORBENE LC (Roquette), DISORBENE M (Roquette), PERMUTEX RM 4409 (Stahl), STOCKOSORB (Stockhausen), FAVOR PAC 230 (Stockhausen), T 5066 (Stockhausen), WACKER HDK H2000 (Wacker) and WACKER HDK V 15 (Wacker).

Moreover, the polyurethanes of the invention or the formulations of the invention are suitable, for example, as a sealant for plastics, metals, mirrors, glass, ceramic, mineral substrates, wood, leather, textiles, paper, cardboard, and rubber, it being possible to seal the materials in each case with themselves or arbitrarily with one another.

Moreover, the polyurethanes of the invention or the formulations of the invention are suitable, for example, as surface coating compositions for surfaces of plastic, metal, glass, ceramic, mineral materials, wood, leather, textiles, paper, cardboard, and rubber.

The polyurethanes of the invention or the formulations of the invention are further suitable for producing emoldngs of any desired three-dimensional form.

A further field of application for the polyurethanes of the invention or the formulations of the invention is their use as dowel hole or crack filling compounds.

The invention further provides an adhesive, surface coating composition or sealing compound prepared using a polymer dispersion of the invention.

The invention is illustrated below by means of examples. All percentages are in percent by weight (% by weight), unless specified otherwise.

Formula example 1

| | |
|---|---|
| Silyl-terminated polyurethane, prepared by reacting 89% by weight Pluriol P 4000 (manufacturer: Bayer AG), 6.5% by weight Desmodur T 100 (manufacturer: Bayer AG) and 4.5% by weight Dynasylan AMMO (manufacturer: Sivento) | 74% |
| Emulsifier Disponil AAP 43 (manufacturer: Henkel) | 2% |
| Water containing 1% sodium carbonate | 24% |
| Solids: 75% | |
| PH: 9.0 | |
| Type: Water is added to the prepolymer | |
| Preparation temperature: 25–35° C. | |

Formula example 2

| | |
|---|---|
| Silyl-terminated polyurethane, prepared by reacting 95% by weight Acclaim DP-8200 (manufacturer: Arco Chemicals) and 5% by weight Silquest Y-5187) (manufacturer: WITCO) | 74% |
| Emulsifier Disponil AAP 43 | 2% |
| Water containing 1% p-toluenesulfonic acid | 24% |
| Solids: 75% | |
| PH: 5.0 | |
| Type: Water is added to the prepolymer | |
| Preparation temperature: 45–50° C. | |

Formula example 3

| | |
|---|---|
| MS-Polymer ® Kaneka-Silyl MAX 450 | 74% |
| Emulsifier Disponil AAP 43 | 2% |
| Water containing 1% p-toluenesulfonic acid | 24% |
| Solids: 75% | |
| PH: 5.0 | |
| Type: Water is added to the prepolymer | |
| Preparation temperature: 30–40° C. | |

Formula example 4

| | |
|---|---|
| Silyl-terminated polyurethane, prepared by reacting 95% by weight Acclaim DP-12200 (manufacturer: Arco Chemicals) and 5% by weight Silquest Y-5187) | 74% |
| Emulsifier Disponil AAP 43 | 2% |
| Water containing 1% p-toluenesulfonic acid | 24% |
| Solids: 75% | |

Preparation of All Emulsions:

The respective polymer was mixed with the emulsifier, and then water was incorporated by stirring with a dissolver. The temperature was less than 100° C.

All of the emulsions had a creamy consistency and dried transparently.

What is claimed is:

1. A polymer dispersion comprising water, at least 60% by weight, of the dispersion, of an organic polymer containing at least one terminal group of the formula $$-A-Si(Z)_n(OH)_{3-n} \quad (I)$$

in which A is $CH_2$ or is a linear or branched, saturated or unsaturated alkylene radical having from 2 to about 12 carbon atoms or is an arylene radical having from about 6 to about 18 carbon atoms or an arylenealkylene radical having from about 7 to about 19 carbon atoms, Z is $CH_3$, $O-CH_3$ or is a linear or branched, saturated or unsaturated alkyl radical or alkoxy radical having from 2 to about 12 carbon atoms, and n is 0, 1 or 2, or a condensation product of at least two groups of the formula I and an emulsifying agent.

2. The polymer dispersion as claimed in claim 1, wherein the organic polymer comprises a polymer selected from the group consisting of polyurethanes, polyesters, polyamides, polyethers, polyacrylates, polymethacrylates, polystyrenes, polybutadienes, polyethylenes, polyvinyl esters, ethylene/α-olefin copolymers, styrene/butadiene copolymers and ethylene/vinyl acetate copolymers, and mixtures of two or more thereof.

3. The polymer dispersion of claim 1 wherein said at least one organic polymer contains no water-dissociable groups.

4. The polymer dispersion of claim 1 wherein said at least one organic polymer is a polyurethane prepared by a method comprising:

(a) reacting at least one polyisocyanate, at least one polyol, and at least one alkoxysilane of the formula $$X-A-Si(Z)_n(OR)_{3-n} \quad (II)$$

wherein X is a radical containing at least one isocyanate-reactive functional group, R is $CH_3$ or a linear or branched, saturated or unsaturated alkyl radical having from 2 to about 12 C atoms and A, Z, and n have the same meaning as in formula I to form a polymer having at least one terminal alkoxysilane group, and (b) hydrolyzing the alkoxysilane group.

5. The polymer dispersion of claim 4 wherein at least one chain extender is additionally used to prepare said polyurethane.

6. The polymer dispersion of claim 4 wherein said at least one polyisocyanate is a diisocyanate.

7. The polymer dispersion of claim 4 wherein said at least one polyisocyanate is an aliphatic diisocyanate.

8. The polymer dispersion of claim 4 wherein said at least one polyol is a polyether polyol which is an alkoxylation product of a difunctional or trifunctional alcohol.

9. The polymer dispersion of claim 4 wherein said at least one polyol is selected from the group consisting of polyether polyols, polyester polyols, polyetherester polyols, polyalkylene diols, polycarbonates, polyacetals, and mixtures thereof.

10. The polymer dispersion of claim 1 having an acid pH.

11. The polymer dispersion of claim 1 additionally comprising at least one additive selected from the group consisting of stabilizers, defoamers, antioxidants, light stabilizers, pigment dispersants, fillers, adhesion promoters, resins, waxes, tackifiers, pH regulators, plasticizers, dyes, and microbiocides.

12. A method of bonding a first material to a second material, said method comprising using the polymer dispersion of claim 1 as an adhesive for said bonding.

13. An adhesive stick comprising the polymer dispersion of claim 1 and at least one thickener.

14. A method of coating a material, said method comprising coating said material with the polymer dispersion of claim 1.

15. A method of sealing a surface, said method comprising sealing said surface with the polymer dispersion of claim 1.

16. A method of producing a molding having a three-dimensional form, said method comprising molding the polymer dispersion of claim 1.

17. The polymer dispersion of claim 1, wherein said organic polymer comprises a silane-terminated polyether.

18. The polymer dispersion of claim 1, wherein said organic polymer, before dispersion in water, comprises a silane-terminated polyether prepared by reacting a polyether polyol with an alkoxysilane compound.

19. The polymer dispersion of claim 18 wherein said alkoxysilane compound has the formula $$Y-A-Si(Z)_n(OR)_{3-n} \quad (III)$$

wherein Y is a radical containing at least one OH-reactive functional group, R is $CH_3$ or a linear or branched, saturated or unsaturated alkyl radical having from 2 to about 12 C atoms and A, Z, and n are as defined in formula (I).

20. The polymer dispersion of claim 19 wherein Y is selected from the group consisting of NCO, halide, oxiaane, acid anhydride, and acid halide.

* * * * *